(12) United States Patent
Shinagawa et al.

(10) Patent No.: US 12,112,107 B2
(45) Date of Patent: Oct. 8, 2024

(54) VIRTUAL METROLOGY FOR WAFER RESULT PREDICTION

(71) Applicant: Tokyo Electron Limited, Tokyo (JP)

(72) Inventors: Jun Shinagawa, Fremont, CA (US);
Megan Wooley, Austin, TX (US);
Toshihiro Kitao, Austin, TX (US);
Carlos Fonseca, Austin, TX (US)

(73) Assignee: Tokyo Electron Limited, Tokyo (JP)

( * ) Notice: Subject to any disclaimer, the term of this patent is extended or adjusted under 35 U.S.C. 154(b) by 1056 days.

(21) Appl. No.: 17/025,651

(22) Filed: Sep. 18, 2020

(65) Prior Publication Data

US 2022/0092242 A1    Mar. 24, 2022

(51) Int. Cl.
*G06F 30/33*    (2020.01)
*G06F 111/10*    (2020.01)

(52) U.S. Cl.
CPC .......... *G06F 30/33* (2020.01); *G06F 2111/10* (2020.01)

(58) Field of Classification Search
CPC ....... G06F 30/33; G06F 2111/10; G03F 7/705
See application file for complete search history.

(56) References Cited

U.S. PATENT DOCUMENTS

| | | |
|---|---|---|
| 8,620,468 B2 | 12/2013 | Moyne |
| 8,682,466 B2 | 3/2014 | Ko et al. |
| 10,409,231 B2 | 9/2019 | Moyne |
| 10,438,805 B2 | 10/2019 | Shinagawa |
| 10,622,219 B2 | 4/2020 | Shinagawa |
| 10,795,346 B2 | 10/2020 | Yennie et al. |
| 10,916,411 B2 | 2/2021 | Shinagawa |
| 2006/0129257 A1 | 6/2006 | Chen et al. |
| 2006/0161403 A1* | 7/2006 | Jiang ................. G06N 20/00 703/2 |
| 2006/0252348 A1 | 11/2006 | Lin et al. |
| 2010/0312374 A1 | 12/2010 | Tsai et al. |
| 2014/0222376 A1* | 8/2014 | Kao ................. G05B 19/41875 702/182 |
| 2016/0342147 A1 | 11/2016 | Iskandar et al. |
| 2017/0098565 A1 | 4/2017 | Lu et al. |

(Continued)

OTHER PUBLICATIONS

Purwin et al. Regression Methods for Prediction of PECVD Silicon Nitride Layer Thickness IEEE International Conference on Automation Science and engineering, Aug. 2011 (Year: 2011).*

(Continued)

*Primary Examiner* — Rehana Perveen
*Assistant Examiner* — Cuong V Luu
(74) *Attorney, Agent, or Firm* — Oblon, McClelland, Maier & Neustadt, L.L.P.

(57) ABSTRACT

Aspects of the disclosure provide a method for wafer result prediction. The method includes determining predictor parameters of a semiconductor process using domain knowledge that includes knowledge of the semiconductor process, a processing tool associated with the semiconductor process, a metrology tool, and/or the wafer. The method also includes removing collinearity among the predictor parameters to obtain key predictor parameters, and selecting a subset of the key predictor parameters based on metrology data of the wafer obtained from the metrology tool. The method further includes building a virtual metrology (VM) model on the subset of the key predictor parameters and may include predicting wafer results using the VM model.

12 Claims, 5 Drawing Sheets

(56) References Cited

U.S. PATENT DOCUMENTS

| | | |
|---|---|---|
| 2018/0040460 A1 | 2/2018 | Gottscho |
| 2018/0082826 A1 | 3/2018 | Guha et al. |
| 2019/0049937 A1 | 2/2019 | Tetiker et al. |
| 2019/0252163 A1 | 8/2019 | Gottscho |
| 2019/0340316 A1* | 11/2019 | Lill ................. G06N 10/00 |

OTHER PUBLICATIONS

Bonate The Effect of Collinearity on Parameter Estimates in Nonlinear Mixed Effect Models Pharmaceutical Research vol. 16, No. 5, 1999 (Year: 1999).*

Kock et al. Lateral Collinearity and Misleading Results in Variance-Based SEM: An Illustration and Recommendations Journal of the ASssociation for Information Systems, vol. 13, Issue 7, pp. 546-580, Jul. 2012 (Year: 2012).*

U.S. Appl. No. 16/538,338, filed Aug. 12, 2019, 2021/0050191 A1, Kenichi Usami, et al.

U.S. Appl. No. 17/350,439, filed Jun. 17, 2021, Jun Shinagawa, et al.

U.S. Appl. No. 17/373,078, filed Jul. 12, 2021, Jun Shinagawa, et al.

\* cited by examiner

VIRTUAL METROLOGY FOR WAFER RESULT PREDICTION

FIELD OF THE INVENTION

The present disclosure relates generally to Advanced Process Control (APC) for semiconductor fabrication and particularly to a virtual metrology (VM) model for predicting semiconductor wafer results.

BACKGROUND

Integrated circuits are produced by a plurality of processes in a semiconductor fabrication facility. The processes may include plasma etching, chemical vapor deposition, thermal oxidization, ion implantation, epitaxy, rapid thermal annealing, etc. During these fabrication processes, semiconductor products (e.g., wafers) are monitored and controlled using metrology tools. However, the high cost of maintaining and operating metrology tools, inconsistent wafer-to-wafer metrology, and undesirable delay in manufacturing cycle time can often result in increased cost and time as well as reduced efficiency and productivity. To address these problems, APC has become an essential component in semiconductor fabrication. Particularly, various VM models have been developed for production control and other purposes associated with costs.

SUMMARY

The present disclosure relates to a method for wafer result prediction and a method for root cause analysis.

A first aspect is a method for wafer result prediction. The method includes determining predictor parameters of a semiconductor process using domain knowledge including knowledge of the semiconductor process, a processing tool associated with the semiconductor process, a metrology tool, and/or the wafer. Collinearity is removed among the predictor parameters to obtain key predictor parameters. A subset of the key predictor parameters is selected based on metrology data of the wafer obtained from the metrology tool. A virtual metrology (VM) model is built on the subset of the key predictor parameters.

According to the first aspect, determining predictor parameters can include determining a first subgroup of predictor parameters using domain knowledge, where the first subgroup of predictor parameters is expected to affect wafer results. A second subgroup of predictor parameters can be determined based on Design of Experiments (DOE) and domain knowledge, where the second subgroup of predictor parameters is a subset of the first subgroup of predictor parameters and known to affect wafer results. A third subgroup of predictor parameters can be obtained by processing manufacturing data collected from the processing tool, where the third subgroup of predictor parameters is associated with the semiconductor process. The third subgroup of predictor parameters can be processed to remove error and variance. For example, parameters that have zero variation can be removed. Interaction terms of the first, second, and third subgroups of predictor parameters can be determined using domain knowledge so that the interaction terms are non-linear and are used as a fourth subgroup of predictor parameters. In some embodiments, at least one interaction term can be a product, a division, and/or another mathematical operation of two or more predictor parameters of the first, second, and third subgroups.

In some embodiments, removing collinearity among the predictor parameters to obtain key predictor parameters includes calculating correlations between a predictor parameter and other predictor parameters, grouping predictor parameters based on correlations, where one or more predictor parameters are grouped together with respective correlations meeting a threshold requirement, and selecting a representative predictor parameter from each group to form the key predictor parameters.

In some embodiments, selecting a subset of the key predictor parameters includes calculating correlations between the key predictor parameters and the metrology data, where the subset of the key predictor parameters meets a correlation threshold requirement.

In some embodiments, building the VM model on the subset of the key predictor parameters includes performing regression analysis using one or more regression models based on the subset of the key predictor parameters, and selecting the VM model from the one or more regression models based on wafer result prediction variation and the number of parameters that are used for the corresponding regression model.

The method can further include predicting wafer results using the VM model.

A second aspect is a method for predicting a wafer characteristic in a plasma process. The method includes determining predictor parameters of the plasma process using domain knowledge including knowledge of the plasma process, a plasma tool associated with the plasma process, a metrology tool, and/or the wafer. Collinearity is removed among the predictor parameters to obtain key predictor parameters. A subset of the key predictor parameters is selected by calculating correlations between the key predictor parameters and metrology data of the wafer obtained from the metrology tool, where the subset of the key predictor parameters meets a correlation threshold requirement. A VM model is built on the subset of the key predictor parameters.

In some embodiments, determining predictor parameters includes determining a first subgroup of predictor parameters using domain knowledge, where the first subgroup of predictor parameters is expected to affect the wafer characteristic. A second subgroup of predictor parameters is determined based on DOE and domain knowledge, where the second subgroup of predictor parameters is a subset of the first subgroup of predictor parameters and known to affect the wafer characteristic. Manufacturing data are collected from the plasma tool, where the manufacturing data include time trace data associated with settings of the plasma tool and/or the plasma process, and a third subgroup of predictor parameters is obtained by processing the manufacturing data, where the third subgroup of predictor parameters is associated with the plasma process. The third subgroup of predictor parameters is processed to remove error and variance. Interaction terms of the first, second, and third subgroups of predictor parameters are determined using domain knowledge so that the interaction terms are non-linear and are used as a fourth subgroup of predictor parameters. Further, knowledge of the plasma process can include physical characteristics and/or chemical characteristics of the plasma process. Knowledge of the plasma tool can include a recipe for the plasma process and/or information of a plasma chamber in the plasma tool. Knowledge of the wafer can include information of a film and/or a substrate of the wafer.

In some embodiments, removing collinearity among the predictor parameters to obtain key predictor parameters includes calculating correlations between a predictor parameter and other predictor parameters, grouping predictor parameters based on correlations, where one or more predictor parameters are grouped together with respective correlations meeting a threshold requirement, and selecting a representative predictor parameter from each group to obtain the key predictor parameters.

In some embodiments, selecting a subset of the key predictor parameters includes calculating correlations between the key predictor parameters and the metrology data, where the subset of the key predictor parameters meets a correlation threshold requirement.

In some embodiments, building the VM model on the subset of the key predictor parameters includes performing regression analysis using one or more regression models based on the subset of the key predictor parameters, and selecting the VM model from the one or more regression models based on wafer result prediction variation and the number of parameters that are used for the corresponding regression model.

In some embodiments, the method may further include predicting a wafer characteristic, where the wafer characteristic is an etch rate or a critical dimension.

A third aspect is a method for root cause analysis of an excursion event. The method includes collecting data in the absence of the excursion event and data in the presence of the excursion event, analyzing the data using a VM module that is constructed using domain knowledge, obtaining, from the VM module, a first model with an excursion event and a second model without an excursion event, and determining a unique term by comparing the first model and the second model, where the unique term is in only one of the first model and the second model.

According to the third aspect, the VM module can include determining predictor parameters of a semiconductor process using domain knowledge including knowledge of the semiconductor process, a processing tool associated with the semiconductor process, a metrology tool, and/or the wafer. Collinearity can be removed among the predictor parameters to obtain key predictor parameters. A subset of the key predictor parameters can be selected based on metrology data of the wafer obtained from the metrology tool. A VM model can be built on the subset of the key predictor parameters.

In some embodiments, determining predictor parameters includes determining a first subgroup of predictor parameters using domain knowledge, where the first subgroup of predictor parameters is expected to affect wafer results. A second subgroup of predictor parameters is determined based on DOE and domain knowledge, where the second subgroup of predictor parameters is a subset of the first subgroup of predictor parameters and known to affect wafer results. A third subgroup of predictor parameters is obtained by processing manufacturing data collected from the processing tool, where the third subgroup of predictor parameters is associated with the semiconductor process. The third subgroup of predictor parameters is processed to remove error and variance. Interaction terms of the first, second, and third subgroups of predictor parameters are determined using domain knowledge so that the interaction terms are non-linear and are used as a fourth subgroup of predictor parameters.

In some embodiments, removing collinearity among the predictor parameters to obtain key predictor parameters can include calculating correlations between a predictor parameter and other predictor parameters, grouping predictor parameters based on correlations, where one or more predictor parameters are grouped together with respective correlations meeting a threshold requirement, and selecting a representative predictor parameter from each group to form the key predictor parameters. Selecting a subset of the key predictor parameters can include calculating correlations between the key predictor parameters and the metrology data, where the subset of the key predictor parameters meets a correlation threshold requirement. Building the VM model on the subset of the key predictor parameters can include performing regression analysis using one or more regression models based on the subset of the key predictor parameters, and selecting the VM model from the one or more regression models based on wafer result prediction variation and the number of parameters that are used for the corresponding regression model.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be increased or reduced for clarity of discussion.

DETAILED DESCRIPTION

Figure 1:
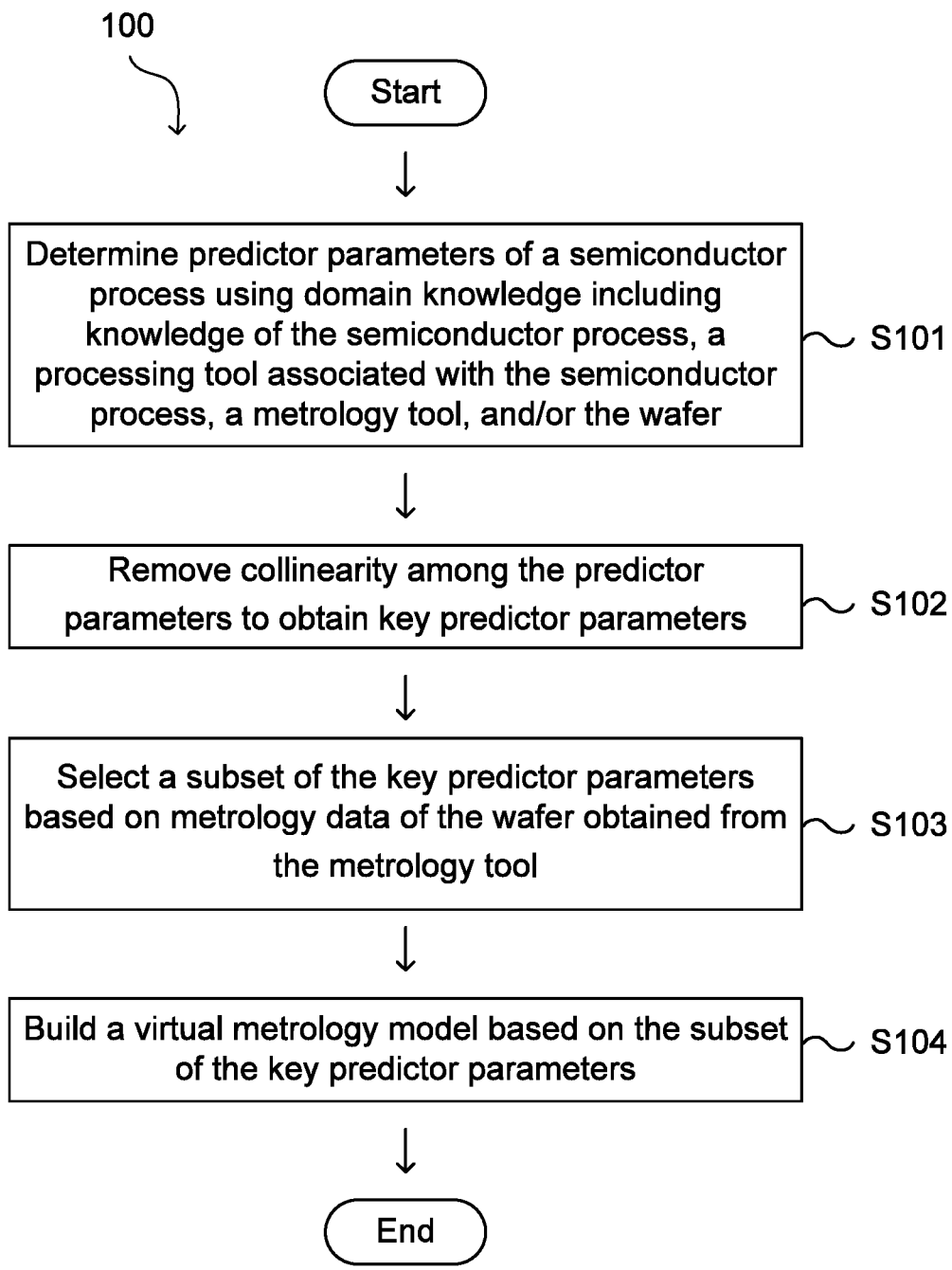
FIG. 1 is a flow chart of an example method for building a VM model for wafer result prediction, in accordance with embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

As noted in the Background, various VM models have been developed for production control, efficiency improvement, and cost reduction. Traditional VM models usually take extensive manpower to check and analyze every single parameter, which is time-consuming. Some key parameters/steps can be missed due to wrong judgement, leading to inaccurate and misleading predictions. Despite efforts to simplify parameter processing and analyzing by leveraging statistical feature selection, those newly developed VM models are inherently a "black box approach." That is, domain knowledge of the semiconductor processes and associated tools is missing so the key parameters selected by statistical analysis bear no physical meaning or engineering background. Moreover, in the case of excursion events, root cause analysis can be inaccurate because parameters associated with failures are selected purely by mathematical methods.

The present disclosure provides a method for building a VM model that integrates domain knowledge into model building. The disclosed method includes determining predictor parameters using domain knowledge, removing collinearity among the predictor parameters, selecting a subset of the remaining predictor parameters based on correlations with metrology data, and building the VM model based on the subset of predictor parameters. In the disclosed method, domain knowledge is inserted into feature extraction, collinearity removal, and feature selection steps to alleviate the ambiguities in predictor importance defined by statistical methods. Therefore, the disclosed method can build a VM model with the least number of predictors to achieve high accuracy while preserving interpretabilities for deep root cause analysis.

FIG. 1 is a flow chart of a method 100 for building a VM model for wafer result prediction, in accordance with embodiments of the disclosure. The method 100 begins with step S101 where predictor parameters of a semiconductor process are determined by using domain knowledge, which includes knowledge of the semiconductor process, a processing tool associated with the semiconductor process, a metrology tool, and/or the wafer. Specifically, a first subgroup of predictor parameters can be determined using domain knowledge so that the first subgroup of predictor parameters is expected to affect wafer results. Then, a second subgroup of predictor parameters is determined based on Design of Experiments (DOE) and domain knowledge so that the second subgroup of predictor parameters is a subset of the first subgroup of predictor parameters and known to affect wafer results. In some embodiments, the second subgroup of predictor parameters is then removed from the first subgroup of predictor parameters. Meanwhile, a third subgroup of predictor parameters can be obtained by processing manufacturing data collected from the processing tool so that the third subgroup of predictor parameters is associated with the semiconductor process. Next, the third subgroups of predictor parameters is processed to remove error and variance, and interaction terms of the first, second, and third subgroups of predictor parameters are determined using domain knowledge so that the interaction terms are non-linear and are used as a fourth subgroup of predictor parameters. For example, an interaction term can be a product, a division, and/or another mathematical operation of two or more predictor parameters of the first, second, and third subgroups. Additionally, the processing tool may include a physical vapor deposition system, a thermal oxidation system, a rapid thermal annealing system, and other tools designed for processing or fabricating semiconductor products, such as a wafer. Therefore, the manufacturing data can include time trace data collected from the processing tool and be processed so that the third subgroup of predictor parameters is associated with the semiconductor process.

At step S102, collinearity among the predictor parameters is removed to obtain key predictor parameters. To remove collinearity, correlations between a predictor parameter and other predictor parameters are calculated. Predictor parameters are then grouped together based on correlations. That is, one or more predictor parameters are grouped together with respective correlations meeting a threshold requirement. Subsequently, a representative predictor parameter is selected from each group to form the key predictor parameters. As a result, the key predictor parameters may have fewer parameters than the predictor parameters. In some embodiments, the aforementioned four subgroups of predictor parameters can be assigned different priorities. For example, the representative predictor parameter can be selected in order of priority: the second subgroup (a first priority), the first subgroup (a second priority), and the third and fourth subgroups (a third priority). Therefore, parameters from a subgroup of a higher priority (e.g., the first priority) are more likely to be selected as one of the key predictor parameters than parameters from a subgroup of a lower priority (e.g., the third priority). Parameters from a subgroup of a lower priority (e.g., the third priority) are more likely to be removed than parameters from a subgroup of a higher priority (e.g., the first priority). In some embodiments, a ranking system may be implemented within one or more subgroups of predictor parameters.

At step S103, a subset of the key predictor parameters is further selected by based on metrology data of the wafer obtained from the metrology tool. In some embodiments, the subset of the key predictor parameters are selected by calculating correlations between the key predictor parameters and the metrology data, where the subset of the key predictor parameters meets a correlation threshold requirement. Alternatively, partial least squares, random forest, gradient boost, or the like can be used to determine relevance of predictor parameters to the metrology data.

The method 100 then proceeds to step S104 where the VM model is built on the subset of the key predictor parameters. Regression analysis is performed using one or more regression models based on the subset of the key predictor parameters, and the VM model is selected from the one or more regression models based on wafer result prediction variation and the number of parameters that are used for the corresponding regression model.

It should be noted that additional steps can be provided before, during, and after the process 100, and some of the steps described can be replaced, eliminated, or performed in a different order for additional embodiments of the process 100. For example, wafer results can be predicted using the VM model after step S104.

Figure 2:
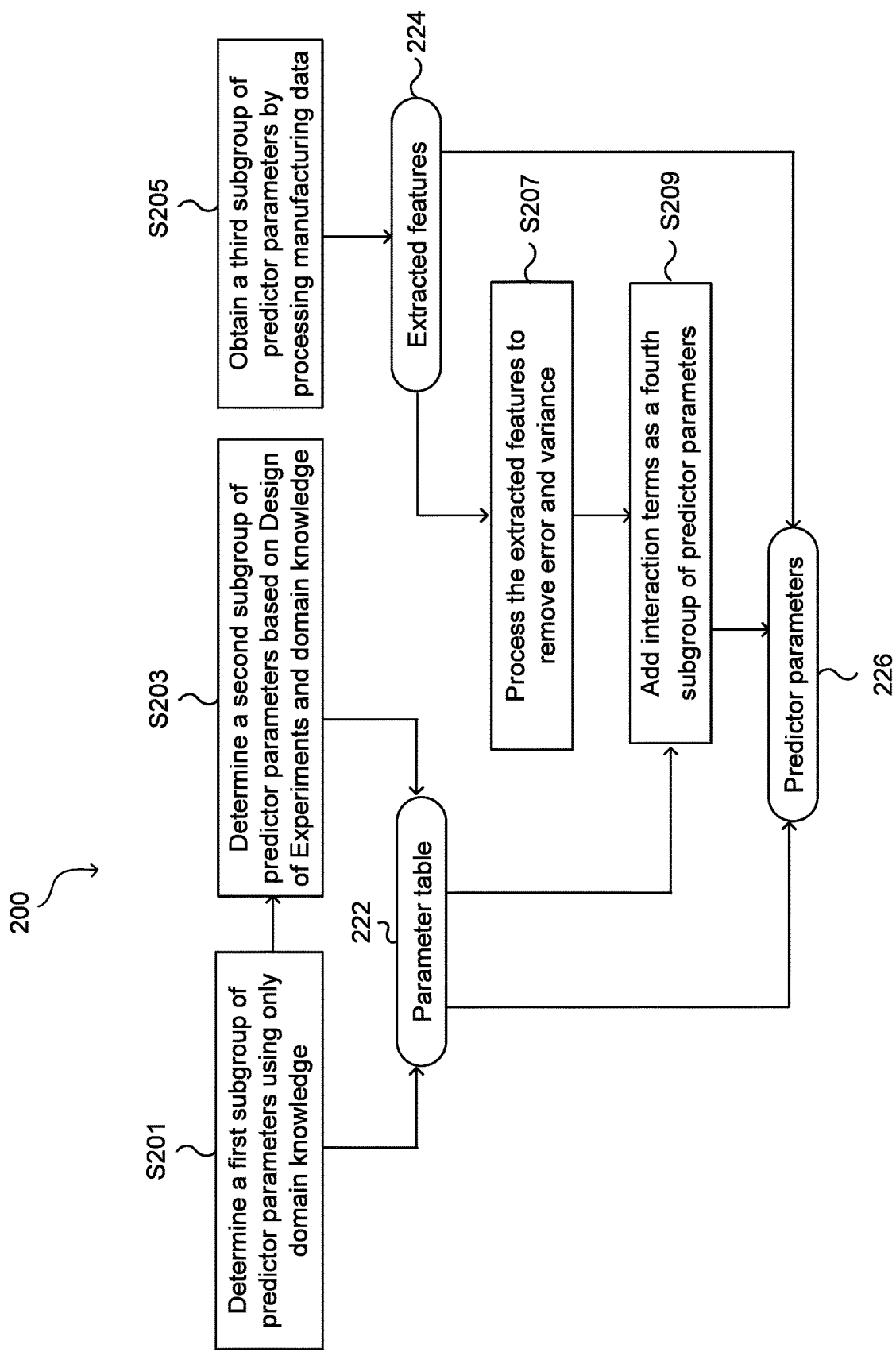
FIG. 2 is a block diagram of an example method for determining predictor parameters for a plasma process, in accordance with embodiments of the disclosure.

FIG. 2 is a block diagram of a method 200 for determining predictor parameters for a plasma process, in accordance with embodiments of the disclosure. The method 200 starts with step S201 by determining a first subgroup of predictor parameters using domain knowledge. The domain knowledge can include knowledge of the plasma process, a plasma tool associated with the plasma process, a metrology tool, and/or the wafer so that the first subgroup of predictor parameters is expected to affect wafer results. In some embodiments, knowledge of the plasma process can include physical characteristics, chemical characteristics, and/or other information of the plasma process, such as atomic and molecular dissociation in plasma, surface reaction model, and plasma diagnostics. Knowledge of the plasma tool can include a recipe for the plasma process, information of a plasma chamber, and/or other information related to the plasma tool, such as recipe parameters. Knowledge of the metrology tool can include a measurement method and/or other information related to the plasma tool, such as actinometry for optical emission spectroscopy. Knowledge of the wafer can include information of a film of the wafer, a substrate of the wafer, and/or the like, such as chemical composition of an exposed film. Domain knowledge can be obtained by collecting prior knowledge in literature, common knowledge within a plasma industry/academia, professional knowledge of a plasma expert, and the like.

Particularly, in a plasma etching process, domain knowledge can include etching mechanism, plasma chamber information, recipe information, wafer information, depth measurement method information, and/or the like. By using any of the domain knowledge, such as etching mechanism, a parameter expected to affect wafer results (e.g., an etching rate or a critical dimension) can be added to the first subgroup of predictor parameters. In an embodiment where an etching byproduct reduces the etching rate, a parameter related to the etching byproduct may be added to first subgroup of predictor parameters. Other parameters, such as chlorine density and oxygen density, can also be added to first subgroup of predictor parameters.

The method 200 then proceeds to step S203 where a second subgroup of predictor parameters are determined based on DOE and domain knowledge. The descriptions of domain knowledge have been provided above and will be omitted here for simplicity purposes. For example, sensitivities of a recipe parameter at a recipe step to a target metric (e.g., the etching rate or the critical dimension) can be determined by DOE, and the recipe parameter is selected based on a sensitivity threshold. Next, a plasma parameter corresponding to the selected recipe parameter is identified by referencing to a plasma parameter library, which is another example of domain knowledge. For example, a flow rate of oxygen in the recipe corresponds to atomic oxygen density in the plasma process. Then, combining the above plasma parameters results in the second subgroup of predictor parameters. Therefore, the second subgroup of predictor parameters is known to affect wafer results and is a subset of the first subgroup of predictor parameters. In some embodiments, the first subgroup of predictor parameters is then removed from the second subgroup of predictor parameters. Additionally, DOE can be analyzed and implemented in many software programs, such as JMP. In some embodiments, the first subgroup of predictor parameters and the second subgroup of predictor parameters are combined to form a parameter table 222.

At step S205, a third subgroup of predictor parameters that are associated with the plasma process are obtained by processing manufacturing data collected from the plasma tool. The third subgroup of predictor parameters can be noted as extracted features 224. The plasma tool can, for example, include a chemical vapor deposition system, a sputtering system, an ion implantation system, and the like. Particularly, in the plasma etching process example mentioned above, the plasma tool includes an etching system. Manufacturing data including time trace data associated with settings of the plasma tool (e.g., a gas flow rate) and/or the plasma process (e.g., an optical emission spectrum), can be collected from the plasma tool. The time trace data are then processed to obtain the third subgroup of predictor parameters that have physical or chemical meanings related to the plasma etching process. In an embodiment, a mean gas flow rate is obtained by calculating the time average gas flow rate and provides information about average etching conditions. In another embodiment, emergence/disappearance of a certain peak in the optical emission spectrum may indicate the onset/endpoint of an etching reaction.

As shown in FIG. 2, the exacted features 224 are then processed to remove errors and variance at step S207. For example, outliers (data points deviate significantly from mean trend) and parameters with small variations can be removed at this step.

At step S209, domain knowledge is used to add interaction terms of the first, second, and third subgroups of predictor parameters as a fourth subgroup of predictor parameters. Hence, the fourth subgroup of predictor parameters is non-linear. In some embodiments, an interaction term can be a product, a division, and/or another mathematical operation of two or more predictor parameters of the first, second, and third subgroups. In the above-mentioned example of the plasma etching process, interaction terms can include the division of chlorine density by oxygen density.

Still in FIG. 2, predictor parameters 226 are finally obtained by combining the the parameter table 222, the extracted features 222, and the interaction terms obtained at step S209. Note that, in some embodiments, two or three subgroups may share a common parameter. The common parameter is noted as a single parameter in the predictor parameters 226 when the four subgroups are combined. Therefore, the predictor parameters 224 include the first, second, third, and fourth subgroups of predictor parameters.

Figure 3:
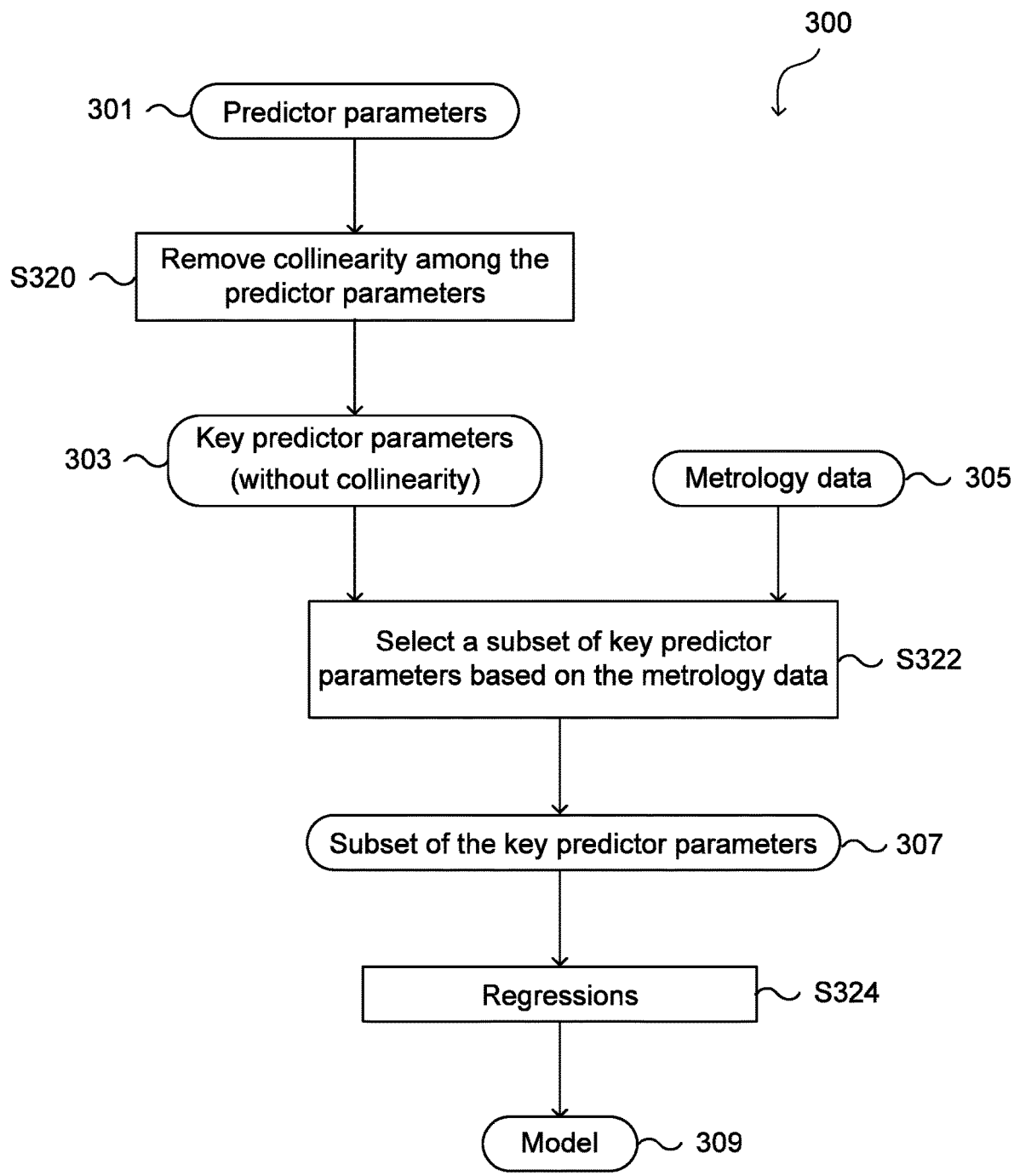
FIG. 3 is a block diagram of building a VM model for a plasma process using predictor parameters, in accordance with embodiments of the disclosure.

FIG. 3 is a block diagram of a method 300 for building a VM model for a plasma process using predictor parameters, in accordance with embodiments of the disclosure. The method 300 starts with predictor parameters 301 that correspond to the predictor parameters 226 in FIG. 2 and can therefore be obtained using the method 200. Similarly, the plasma process in FIG. 3 can correspond to the plasma process in FIG. 2.

At step S320, collinearity is removed among the predictor parameters 301. Collinearity removal is accomplished by calculating correlations between a predictor parameter and other predictor parameters, and then grouping predictor parameters based on correlations. In other words, one or more predictor parameters are grouped together with respective correlations meeting a threshold requirement. Subsequently, a representative predictor parameter is selected from each group to form key predictor parameters. Consequently, the key predictor parameters can have fewer parameters than the predictor parameters 301. Moreover, the key predictor parameters have no collinearity with one another. Similar to step S102, different priorities may be assigned to the subgroups of the predictor parameters, and ranking may be implemented within one or more subgroups. The descriptions have been provided above and will be omitted here for simplicity purposes.

Before the method 200 proceeds to step S322, metrology data 305 are collected from at least one metrology tool and show wafer results of interest. The metrology tool(s) may include electrical, optical, and/or analytical tools, such as resistivity measurement tools, film thickness measurement tools, optical microscopes, transmission/scanning electron microscopes, and other test and measurement tools. The metrology data 305 may include various wafer characteristics measured by the metrology tool(s), such as sheet resistance, reflectivity, and the like. Particularly, in the plasma etching process example above, the metrology data 305 can be an etching rate or a critical dimension.

At step S322, a subset of key predictor parameters are selected based on correlations with the metrology data 305. Specifically, the correlation between a key predictor parameter 303 and the metrology data 305 is calculated, and the key predictor parameter 303 that meets a correlation threshold requirement is then included in the subset of key predictor parameters 307. Statistical methods, such as linear models, random forest, and partial least squares, can be used for determining the correlations. In the example of the plasma etching process, metrology data, such as the critical dimension, can be used as a target metric to evaluate the importance of the key predictor parameters 303. The correlation threshold requirement can remove a portion of the key predictor parameters to which the critical dimension is insensitive.

At step S324, regression analysis is performed using one or more regression models based on the subset of the key predictor parameters 307. The one or more regression models may include an exhaustive linear model with highest importance predictors, regularized linear regression (Lasso), forward stepwise selection with known parameters, and the like. The one or more regression models can then be evaluated by wafer result prediction variation and the number of parameters that are used for the corresponding regression model. As a result, a VM model 309 is then selected from the one or more regression models. The VM model 309 can be used to predict wafer results in a plasma process, such as a plasma etching process. Additionally, the VM model 309 corresponds to the VM model built at step S104 by the method 100 in FIG. 1.

Figure 4:
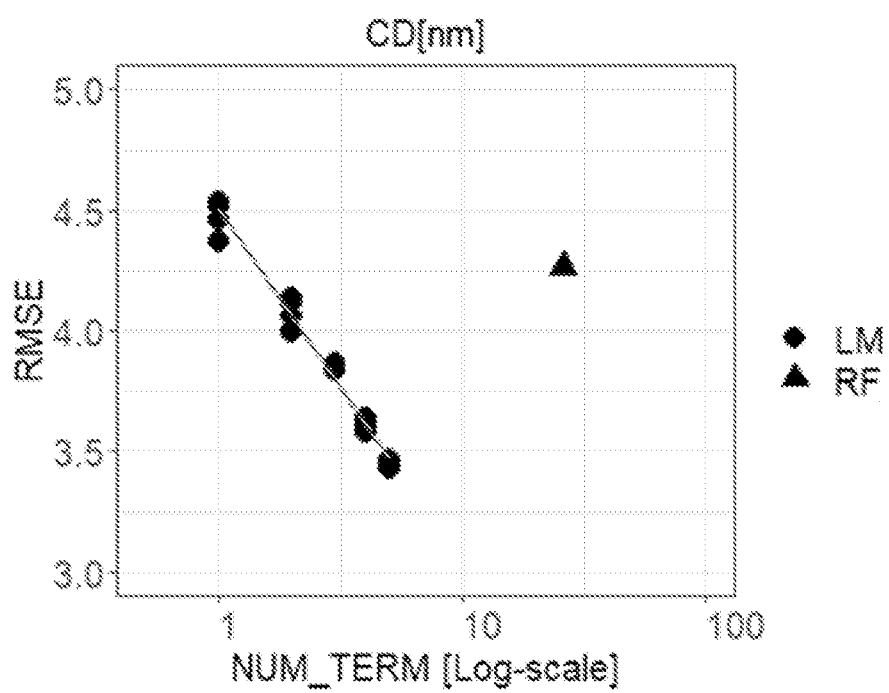
FIG. 4 shows a comparison between a VM model built by the disclosed method and a related example, in accordance with embodiments of the disclosure.

FIG. 4 shows a comparison between a VM model built by the disclosed method and a related example, in accordance with embodiments of the disclosure. In this example, the metrology data include a critical dimension (noted as CD in the graph). The graph shows root mean square error (noted as RMSE) as a function of the number of input parameters (noted as NUM_TERM). For simplicity, two models are compared here: a linear model (noted as LM) and a random forest model (noted as RF). LM can be a VM model that has been developed by the disclosed method and exhaustively tests all possible combinations of the subset of key predictor parameters while RF is a related example utilizing all input parameters. As shown, the RMSE for LM is quickly reduced from around 4.0 to below 3.5 when the NUM_TERM increases from 1 to 2, which is an order of magnitude smaller than 23, the NUM_TERM of RF when the RMSE for RF is about 3.5. Further, the RMSE for LM drops to about 3.0 when the NUM_TERM is 4. In general, model performance improves with an increased number of input parameters due to increased variance or "flexibility." Nevertheless, LM with fewer parameters performs better than RF with many more input parameters, demonstrating that the disclosed method effectively removes collinearities while selecting important features to explain CD variation.

Figure 5:
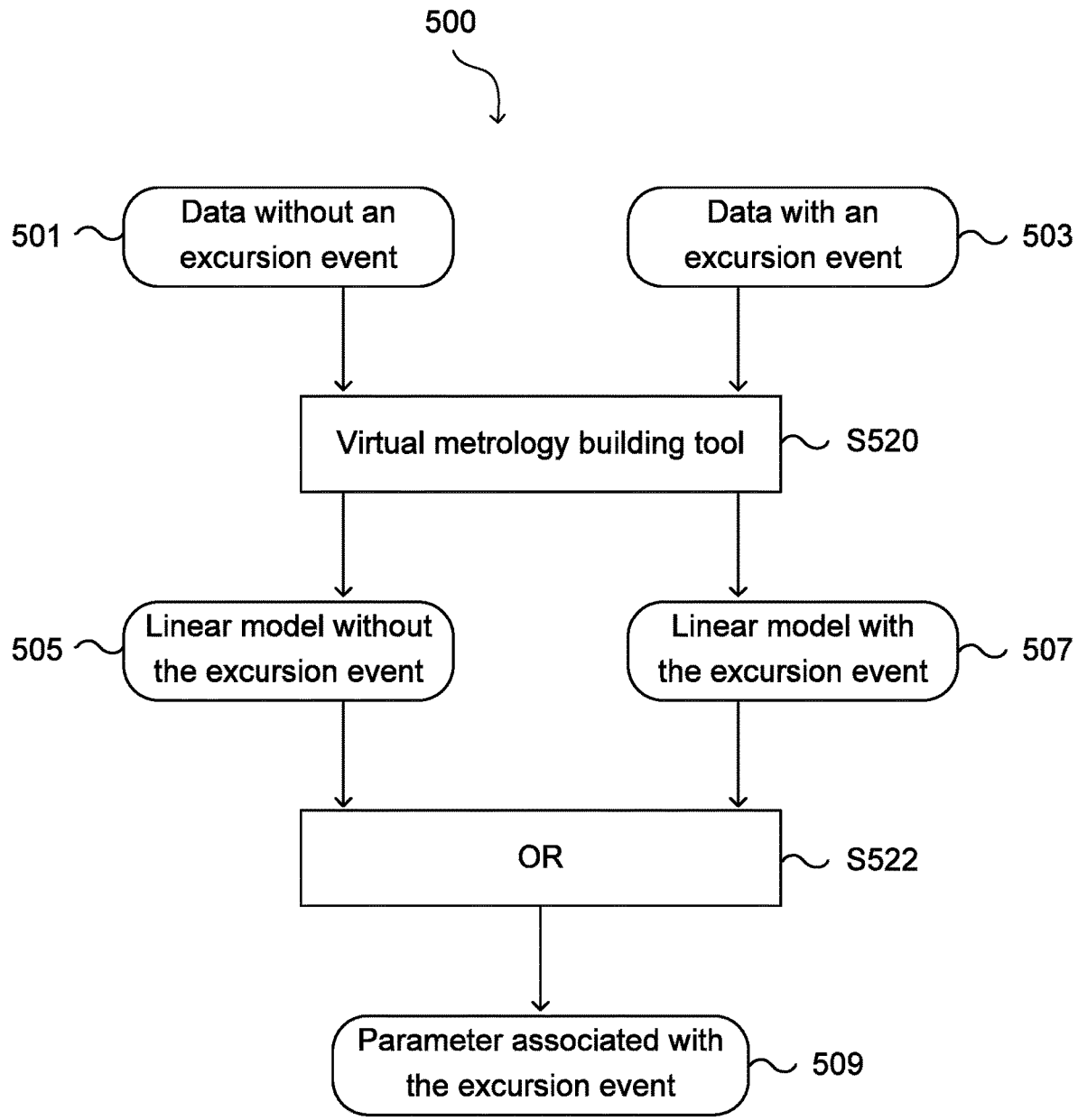
FIG. 5 is a block diagram of root cause analysis, in accordance with embodiments of the disclosure.

FIG. 5 is a block diagram of a method 500 for root cause analysis, in accordance with embodiments of the disclosure. When a failure occurs in a semiconductor process, at least one excursion event can be observed in data collected from a processing tool and/or a metrology tool. The failure may include leakage current, delamination, shift in parameters, insulation breakdown, and other failure modes in semiconductors. The method 500 can be used for the root cause analyses of the failure. As illustrated, data without the excursion event 501 and data with the excursion event 503 are collected. Note that the data without the excursion event 501 can include data collected before the occurrence of the failure.

Subsequently, data without the excursion event 501 and data with the excursion event 503 are processed by a VM builder tool at step S520. The VM builder tool is a module for building a VM model based on input data and can, for example, be the method 100 in FIG. 1 or the method 300 in FIG. 3. As a result, various VM models can be generated by the VM builder tool. In this example, at least one linear model without the excursion event 505 and at least one linear model with the excursion event 507 are generated by the data without the excursion event 501 and the data with the excursion event 503. In other examples, a non-linear model without the excursion event and a non-linear model with the excursion event may be generated.

The method 500 then proceeds to step S522 where the linear model without the excursion event 505 and the linear model with the excursion event 507 are input into an OR module. The OR module is designed and configured to compare input models and output at least one unique term that is only in one of the input models. In an example where the linear model without the excursion event 505 and the linear model with the excursion event 507 include $a_1 x_1 + a_2 x_2$ and $a_1 x_1 + a_2 x_2 + a_3 x_3$, respectively, the OR module outputs the unique term, $a_3 x_3$.

Further, the unique term output by the OR module can contain a parameter 509 that is associated with the excursion event. Hence, the root cause of the failure can be identified, and the failure can be fixed accordingly by adjusting the parameter 509. In this example, the parameter 509 is $x_3$. In an embodiment where a failure related to a critical dimension occurs in a plasma etching process, the parameter 509, $x_3$ can be a gas flow rate for instance. In the disclosed method, predictor parameters are proxy to fundamental plasma properties that can be directly related to an etching rate or a critical dimension through a fundamental surface reaction model. Therefore, the disclosed method preserves interpretabilities for deep root cause analysis. In related examples, non-supervised classification techniques such as principal component analysis or clustering can be used to search for variations occurring during the failure. However, highly varied parameters determined by these non-supervised classification techniques do not necessarily impact critical dimension variation.

The various embodiments described herein offer several advantages. For example, in the disclosed method, domain knowledge is inserted into feature extraction, collinearity removal, and feature selection steps to alleviate the ambiguities in predictor importance defined by statistical methods. Therefore, the disclosed method is no longer a "black box approach." Moreover, the disclosed method can build a VM model with the least number of predictors to achieve high accuracy while preserving interpretabilities for deep root cause analysis.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

"Substrate" or "target substrate" as used herein generically refers to an object being processed in accordance with the invention. The substrate may include any material portion or structure of a device, particularly a semiconductor or other electronics device, and may, for example, be a base substrate structure, such as a semiconductor wafer, reticle, or a layer on or overlying a base substrate structure such as a thin film. Thus, substrate is not limited to any particular base structure, underlying layer or overlying layer, patterned or un-patterned, but rather, is contemplated to include any such layer or base structure, and any combination of layers and/or base structures. The description may reference particular types of substrates, but this is for illustrative purposes only.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. A method for wafer result prediction and root cause analysis, comprising:
   before a failure occurs, executing a plasma etching process;
     collecting first data of the plasma etching process;
     determining predictor parameters of the plasma etching process using domain knowledge including knowledge of the plasma etching process, a plasma etching tool associated with the plasma etching process, a metrology tool, and/or the wafer;
     removing collinearity among the predictor parameters to obtain key predictor parameters;
     collecting metrology data of the wafer using the metrology tool, the metrology data related to the plasma etching process;
     selecting a subset of the key predictor parameters based on the metrology data of the wafer;
     building a virtual metrology (VM) model on the subset of the key predictor parameters; and
     predicting wafer results of the plasma etching process using the VM model,
     wherein determining the predictor parameters comprises determining a first subgroup of predictor parameters using domain knowledge, the first subgroup of predictor parameters expected to affect wafer results; and determining a second subgroup of predictor parameters based on Design of Experiments (DOE) and domain knowledge, the second subgroup of predictor parameters being a subset of the first subgroup of predictor parameters and known to affect wafer results,
   after the failure occurs, executing the plasma etching process; and
     collecting second data of the plasma etching process;
   identifying a parameter associated with a root cause of the failure using the VM model, the first data and the second data;
   fixing the failure by adjusting the parameter; and
   executing the plasma etching process using the parameter adjusted.

2. The method of claim 1, further comprising:
   obtaining a third subgroup of predictor parameters by processing manufacturing data collected from the processing tool, the third subgroup of predictor parameters associated with the semiconductor process; and
   processing the third subgroup of predictor parameters to remove error and variance.

3. The method of claim 2, further comprising:
   determining interaction terms of the first, second, and/or third subgroups of predictor parameters using domain knowledge so that the interaction terms are non-linear and are used as a fourth subgroup of predictor parameters.

4. The method of claim 3, wherein at least one interaction term is a product, a division, and/or another mathematical operation of two or more predictor parameters of the first, second, and third subgroups.

5. The method of claim 1, wherein selecting a subset of the key predictor parameters comprises:
   calculating correlations between the key predictor parameters and the metrology data, the subset of the key predictor parameters meeting a correlation threshold requirement.

6. The method of claim 1, wherein removing collinearity among the predictor parameters to obtain key predictor parameters comprises:
   calculating correlations between a predictor parameter and other predictor parameters;
   grouping predictor parameters based on correlations, wherein one or more predictor parameters are grouped together with respective correlations meeting a threshold requirement; and
   selecting a representative predictor parameter from each group to form the key predictor parameters.

7. The method of claim 1, wherein building the VM model on the subset of the key predictor parameters comprises:
   performing regression analysis using only one regression model or a plurality of regression models based on the subset of the key predictor parameters; and
   when the plurality of regression models are used, selecting the VM model from the plurality of regression models based on wafer result prediction variation and the number of parameters that are used for the corresponding regression model, or when the only one regression model is used, selecting the only one regression model as the VM model.

8. The method of claim 1, wherein:
   knowledge of the plasma etching process includes physical characteristics and/or chemical characteristics of the plasma etching process;

knowledge of the plasma etching tool includes a recipe for the plasma etching process and/or information of a plasma chamber in the plasma etching tool; and knowledge of the wafer includes information of a film and/or a substrate of the wafer.

9. The method of claim 1, wherein:

the metrology data comprise data of a critical dimension (CD) or data of an etching rate (ER), and the wafer results of the plasma etching process predicted by the VM model comprise a CD or an ER.

10. The method of claim 9, wherein:

the metrology tool comprises a film thickness measurement tool, an optical microscope, a transmission electron microscope or a scanning electron microscope.

11. The method of claim 1, wherein:

the root cause of the failure includes at least one selected from the group consisting of leakage current, delamination, shift in parameters, insulation breakdown and a semiconductor failure.

12. The method of claim 1, wherein:

obtaining a first model, which is not associated with the failure, based on the first data and the VM model;

obtaining a second model, which is associated with the failure, based on the second data and the VM model; and determining a unique term by comparing the first model and the second model to identify the root cause of the failure, the unique term being in only one of the first model and the second model, the parameter associated with the root cause of the failure being contained in the unique term.

* * * * *